(12) United States Patent
Preti

(10) Patent No.: US 6,675,951 B2
(45) Date of Patent: Jan. 13, 2004

(54) APPARATUS FOR THE HANDLING OF CONTAINERS

(75) Inventor: Fabrizio Preti, Parma (IT)

(73) Assignee: Sig Simonazzi S.p.A., Parma (IT)

( * ) Notice: Subject to any disclaimer, the term of this patent is extended or adjusted under 35 U.S.C. 154(b) by 0 days.

(21) Appl. No.: 10/233,549

(22) Filed: Sep. 4, 2002

(65) Prior Publication Data
US 2003/0051976 A1 Mar. 20, 2003

(30) Foreign Application Priority Data
Sep. 20, 2001 (EP) ............................................. 01830593

(51) Int. Cl.[7] .......................... B65G 29/00; B65G 23/22
(52) U.S. Cl. .............................. 198/470.1; 198/478.1; 198/860.1; 198/860.5; 198/450
(58) Field of Search .......................... 198/470.1, 478.1, 198/860.1, 860.3, 860.4, 860.5, 450; 312/350; 250/223 R, 223 B

(56) References Cited

U.S. PATENT DOCUMENTS

| 3,586,444 A | * | 6/1971 | Sproul ........................ 356/129 |
| 3,973,665 A | * | 8/1976 | Giammanco ................. 198/219 |
| 5,111,963 A | * | 5/1992 | Grace, Sr. ..................... 221/75 |
| 5,161,678 A | * | 11/1992 | Garvey ..................... 198/860.3 |
| 5,315,108 A | * | 5/1994 | Gross ..................... 250/223 B |
| 5,489,106 A | * | 2/1996 | Engelking et al. ........ 280/47.35 |
| 5,713,791 A | * | 2/1998 | Long et al. ................. 454/187 |
| 6,428,122 B1 | * | 8/2002 | Henry et al. ................... 312/1 |
| 6,471,010 B2 | * | 10/2002 | McCrandall et al. ........ 187/244 |

FOREIGN PATENT DOCUMENTS

| DE | 198 35 369 C1 | 10/1999 | |
| EP | 0 352 031 A1 | * 1/1990 | ............. 198/478.1 |
| GB | 2 255 051 A | * 10/1992 | ............. 198/478.1 |
| WO | WO 00/37353 | 6/2000 | |

* cited by examiner

Primary Examiner—Douglas Hess
(74) Attorney, Agent, or Firm—Dickstein Shapiro Morin & Oshinsky, LLP

(57) ABSTRACT

An apparatus for the handling of containers comprising a frame and a plate that is removably fixed to the frame. The plate is disposed on the frame in a raised position and supports from above one or more distribution units and/or one or more operating units. The motor drives for the distribution units and/or operating units are disposed above the units.

17 Claims, 3 Drawing Sheets

APPARATUS FOR THE HANDLING OF CONTAINERS

FIELD OF THE INVENTION

The present invention relates to an apparatus for the handling of containers, in particular bottles.

BACKGROUND OF THE INVENTION

The apparatuses to which the present invention especially refers are those equipped with one or more star conveyors for conveying containers to and from processing stations, where such processing stations may be disposed within or on the periphery of the handling apparatus. This type of apparatus is normally modular, each module comprising one or more star conveyors and optionally one or more processing stations for processing the containers, such as stations for rinsing, filling, capsule placement, labelling and so on. The various star conveyors and the optional processing stations are mounted on a platform resting on the floor. The motor drive and the transmission gears are positioned below the platform and impart the drive to the units above them by means of transmission shafts which pass through the surface of the platform. Since it is customary for liquids—such as the actual beverages (in the case of filling stations) or the adhesive (in the case of labelling stations)—to run out from the processing stations, it is obvious that such liquids may contaminate the supporting platform and thence penetrate below it until they reach the motor and the delicate transmission mechanisms. This makes the operations of cleaning the machine more difficult if indeed it does not cause the machine to malfunction.

To eliminate this problem, apparatuses have been proposed in which the platform has two inclined layers such as to cause any liquids that may have escaped to drain away. However, even this solution does not entirely eliminate the problem of contamination and cleaning of the machine.

A further solution to the problem is that of dispensing with the supporting platform below the handling and processing stations, suspending them from a structure provided with a top, above which the transmission mechanisms and the motor drive are disposed. Even though this solution solves the problem of contamination of the gears by liquids escaping from the processing stations, it nevertheless has the disadvantage of significant inconvenience when mounting the components on the top and in the course of their regular maintenance, because of the fact that they are disposed at a height greater than that of a man. This requires the use of ladders or staging and involves the need to raise components, some of which are of substantial weight, by means of appropriate lifting gear.

SUMMARY OF THE INVENTION

It is an object of the present invention to provide an apparatus for the handling of containers that does not exhibit the disadvantages of the prior art.

This object is achieved by an apparatus for the handling of containers as defined in the appended claims.

Further features and advantages of the apparatus for the handling of containers forming the subject of the present invention will become more apparent from the description of an example of embodiment given below by way of indication and without implying any limitation, with reference to the figures that follow.

DETAILED DESCRIPTION OF THE INVENTION

Figure 1:
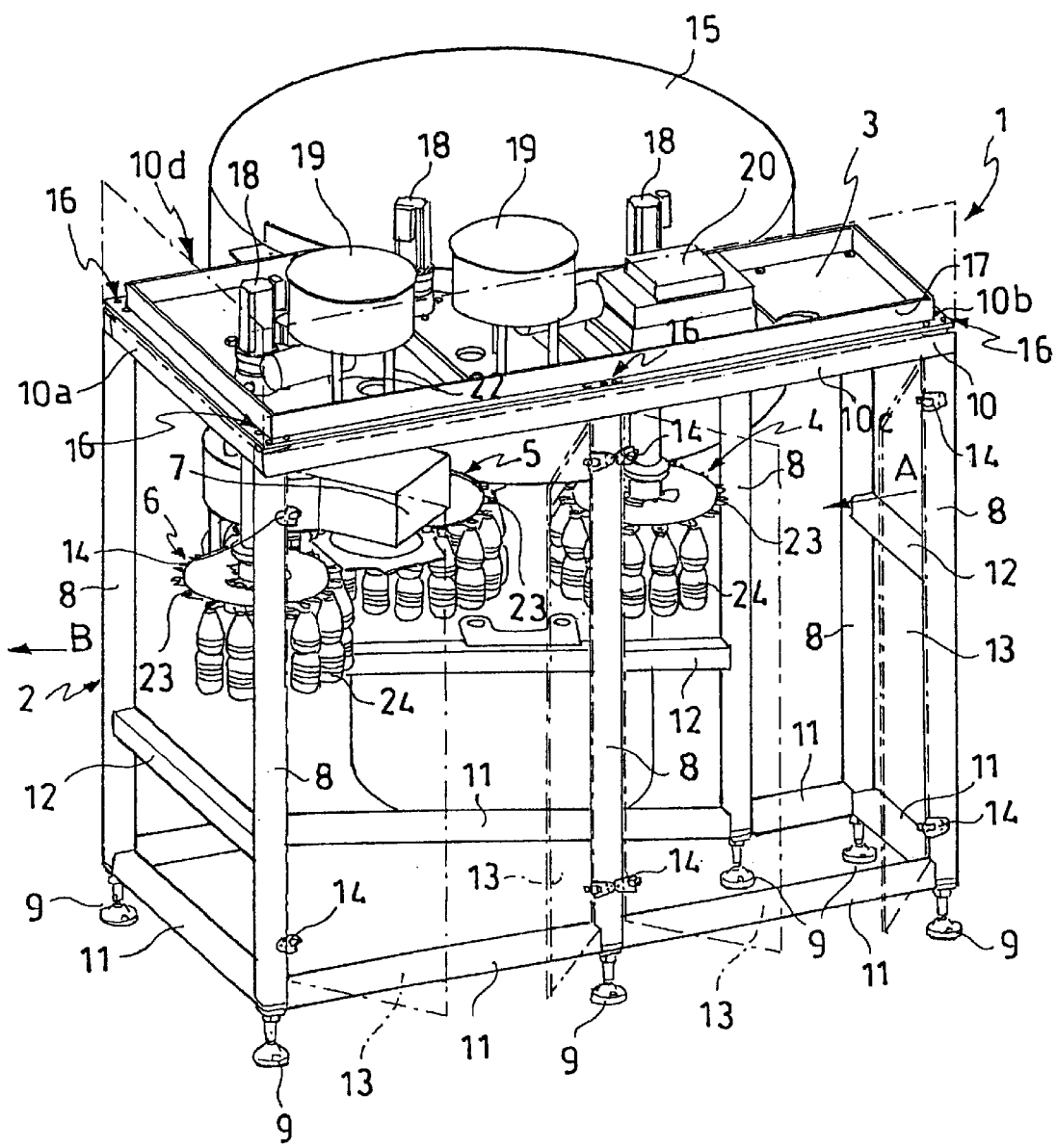
FIG. 1 shows a perspective view of the apparatus according to the present invention.
Figure 2:
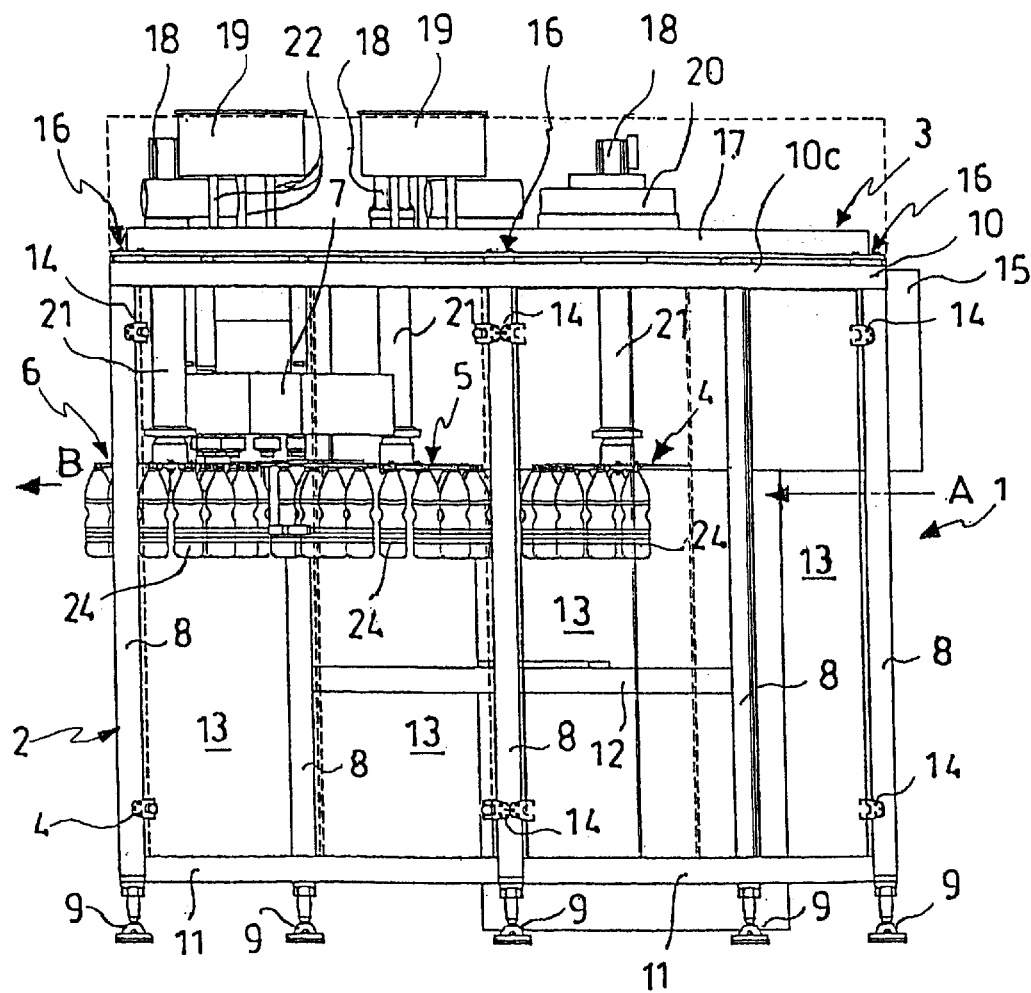
FIG. 2 shows a lateral view of the apparatus according to FIG. 1.

With reference to the figures, the apparatus for the handling of containers, designated as a whole by the reference numeral 1, comprises a frame 2 which bears a plate 3, which in turn supports from above a plurality of distribution units, in the example shown in the figures three distribution stars 4, 5, 6, and an operating unit, in this example a capsule placement apparatus 7.

The frame 2 comprises a plurality of legs 8 fitted with feet 9, connected at their upper ends by a peripheral rim 10 and below by reinforcing bars 11, 12. The height of the legs 8 will generally be such as to enable a man to enter below the processing units, for any necessary work on the line during the operating phase of the apparatus.

The space of the frame 2 contained within the legs h8, the upper peripheral rim 10 and the said reinforcing bars 11 can be closed by panels 13, preferably transparent panels such as to permit visual inspection of the functioning of the apparatus. On one or more sides, such panels 13 may be articulated on the legs 8 by means of hinges 14, so as to be capable of opening to allow access to the processing area of the apparatus. Should it be necessary, as normally occurs, to bring in the containers, for example in direction A, from other upstream processing stations and subsequently send them, in direction B, to other downstream processing stations, the panels 13 disposed on these sides will in such cases have apertures (not shown) equipped with conventional sealing means which allow the passage of the containers through the panel 13 while minimizing the exchange of air with the outside.

Figure 3:
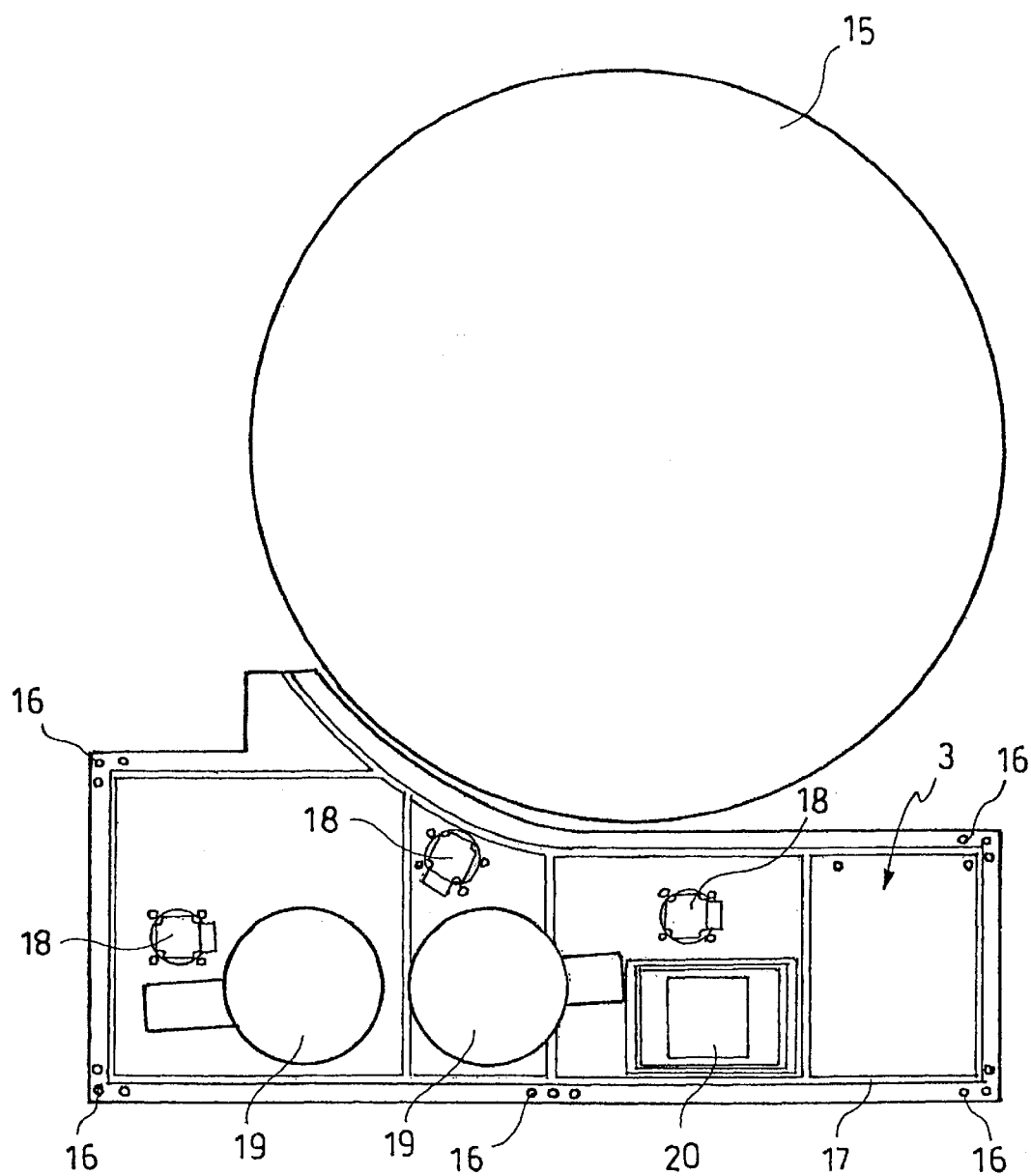
FIG. 3 shows a view from above of the apparatus according to FIG. 1.

As shown in FIG. 3, the peripheral rim 10, seen from above, is of irregular shape, having two opposite shorter sides 10a, 10b of different lengths, connected by a longer, rectilinear side 10c forming right-angled corners with the said shorter sides 10a, 10b. The second longer side 10d, however, from the two shorter sides 10a, 10b, develops rectilinear sections connected by a curved section. The reason for this particular shape, in the example shown in the figures, is the need to link the apparatus according to the invention to a carousel for the processing of the containers, in this specific case a filling apparatus 15. It is thus apparent that in different applications the apparatus according to the invention could have a different shape in plan view, for example a rectangular shape.

The plate 3 has a shape and dimensions substantially corresponding to those of the peripheral rim 10 of the frame 2 and comprises along its periphery removable means 16 for fixing the plate to the frame. In the example, these removable fixing means are a screw-and-nut system. The plate 3 comprises, along its outer perimeter or in a slightly retracted position, upward-extending perimetral side walls 17.

On the surface of the plate 3 contained within said perimetral side walls 17 are disposed, in the example shown in the figures, the motors 18 for the independent driving of the three distribution stars 4, 5, 6 (the motor drive of the capsule placement apparatus 7 is not shown, being included in the body of the said capsule placement apparatus). The plate 3 also accommodates the hoppers 19 for feeding the stoppers to the capsule placement apparatus and ventilation and air filtration means 20.

The motors 18 are connected, by means of respective transmission shafts 21 which pass through the plate 3, to the respective distribution stars 4, 5, 6. The distribution stars 4, 5, 6 further comprise, on their periphery, grippers 23 of a known type, able to engage with the necks of the bottles 24.

However, appropriate channels 22 undertake the feeding of the stoppers to the capsule placement apparatus 7. Both the distribution stars 4, 5, 6 and the capsule placement apparatus 7 are of conventional types and will therefore not be described in more detail.

The motors 18 of the distribution stars 4, 5, 6, like the motor of the capsule placement apparatus 7, are preferably electric motors, in particular brushless motors or stepping motors. In each case, these motors 18 must be synchronized with one another and with the filling apparatus 15. The apparatus of the present invention will therefore be able to comprise a control and monitoring unit which undertakes the control of the movement of all the moving parts and the monitoring of the proper functioning of the plant.

The ventilation and air filtration means 20, of a conventional type, are disposed in an aerating aperture made in the plate 3 and may be connected to a sterile air source by means of appropriate piping (neither being shown in the figures).

The apparatus 1 according to the invention is assembled as follows. First of all, the distribution and operating units (the distribution stars 4, 5, 6 with the associated motors 18, the capsule placement apparatus 7 with the associated hoppers 19 and the ventilation and air filtration means 20) are mounted on the plate 3 while the latter is still disconnected from the frame 2. Then the plate 3, thus previously equipped, is disposed on the frame 2 and removably fixed, for example by means of a screw-and-nut system.

In the operating state, the empty bottles 24 arrive at the first distribution star 4 in the direction A by means of a conventional conveying system, such as for example a conveyor belt (not shown). The bottles 24, engaged by the grippers 23, are transferred to the filling apparatus 15 where filling with the beverage takes place. From the filling apparatus 15, the full bottles 24 are picked up by the grippers 23 of the second distribution star 5, which provides for their transfer to the capsule placement apparatus 7. The stoppered bottles 24 are then transferred, by means of the third distribution star 6, from the capsule placement apparatus to conveying means (not shown) which send the bottles 24 in the direction B for storage or further processing, such as for example labelling or sterilization.

From what has been described above, the advantages of the apparatus according to the present invention are immediately apparent.

Specifically, the apparatus for the handling of containers forming the subject of the present invention prevents contamination of the gears and of the motor drive by the liquids escaping from the operating units, in that the gears and motor drive are disposed above the processing area. At the same time, the operator is not required to install or perform maintenance work on the mechanisms of the machine in the inconvenient positions which the particular configuration of the apparatus would entail. Specifically, the plate 3 can be easily removed from the frame 2 and can therefore be positioned at a height appropriate to the requirements of the technician, such as, for example, on a second frame of a suitably lower height.

A further advantage of the particular embodiment of the apparatus according to the invention described here is the provision of the independent, electronically synchronized motor drives 18 for each rotating or otherwise moving unit of the machine. This solution makes it possible to minimize the use of gears and so to reduce wear and maintenance thereof.

The presence of the panels 13 which, while making the interior of the machine available for both visual and physical inspection, insulate it from the outside, constitutes a third advantage of the present apparatus. Specifically, it is possible to introduce sterile air into the apparatus or otherwise to create a controlled atmosphere during the operational phase, depending on the particular processing requirements.

Clearly, what has been described is only one particular embodiment of the apparatus for the handling of containers forming the subject of the present invention, to which the person skilled in the art will be able to make any such modifications as are necessary to adapt it to particular applications, without thereby departing from the scope of protection of the present invention.

For example, the shape and the dimensions of the apparatus and of the associated frame 2 will vary in accordance with requirements, in particular as a function of the need to link the apparatus to externally positioned processing carousels (such as the filling apparatus 15 of the example described above) or to downstream and/or upstream conveyor systems for the containers.

The number and types of the distribution stars 4, 5, 6 and of the operating units positioned within the apparatus may also be different from case to case. The apparatus will in fact also be able to comprise more than one processing unit, such as for example a filling apparatus and a capsule placement apparatus or a capsule placement apparatus and a labelling apparatus or all three, and so on. In place of the independent motor drives 18 shown in the example described here, it will be possible to provide a conventional motor drive in which the motion is transmitted to the various units by means of gears and toothed wheels.

The means 16 for the removable fixing of the plate 3 to the frame 2 may be of any type, such as for example hook-type systems.

What is claimed is:

1. Apparatus (1) for the handling of containers (24), comprising a frame (2) with a plurality of legs (8) and a plate (3) disposed on the said frame in a raised position, the said frame (2) supporting from above one or more distribution units (4, 5, 6) having a motor drive (18) and/or one or more operating units (7) having a motor drive (18) in a manner such that the said one or more distribution units and/or the said one or more operating units are suspended the motor drive (18) of the said one or more distribution units (4, 5, 6) and/or of the said one or more operating units (7) being disposed above the said units, characterized in that the said apparatus comprises removable means (16) for fixing the said plate (3) to the said frame (2).

2. Apparatus (1) according to claim 1, wherein the said removable fixing means (16) for fixing the said plate (3) to the said frame (2) are a screw-and-nut system.

3. Apparatus (1) according to claim 2, wherein the said frame (2) presents an upper peripheral rim (10), the said plate (3) being fixed to the said upper peripheral rim (10).

4. Apparatus (1) according to claim 3, wherein the said frame (2) comprises panels (13) which define in whole or in part the surface included between the legs (8) and the upper peripheral rim (10) of the frame (2).

5. Apparatus (1) according to claim 2, wherein the said frame (2) comprises panels (13) which define in whole or in part the surface included between the legs (8) and the upper peripheral rim (10) of the frame (2).

6. Apparatus (1) according to claim 1, wherein the said frame (2) presents an upper peripheral rim (10), the said plate (3) being fixed to the said upper peripheral rim (10).

7. Apparatus (1) according to claim 6, wherein the said frame (2) comprises panels (13) which define in whole or in part the surface included between the legs (8) and the upper peripheral rim (10) of the frame (2).

8. Apparatus (1) according to claim 6, wherein the said one or more distribution units (4, 5, 6) and/or the said one or more operating units (7) are each driven by an independent motor (18), the said motors (18) being controlled in a synchronized manner.

9. Apparatus (1) according to claim 1, wherein the said frame (2) comprises panels (13) which define in whole or in part the surface included between the legs (8) and the upper peripheral rim (10) of the frame (2).

10. Apparatus (1) according to claim 9, wherein at least one of the said panels (13) is transparent.

11. Apparatus (1) according to claim 10, wherein at least one of the said panels (13) is capable of opening.

12. Apparatus (1) according to claim 9, wherein at least one of the said panels (13) is capable of opening.

13. Apparatus (1) according to claim 9, wherein the said one or more distribution units (4, 5, 6) and/or the said one or more operating units (7) are each driven by an independent motor (18), the said motors (18) being controlled in a synchronized manner.

14. Apparatus (1) according to claim 1, wherein the said one or more distribution units (4, 5, 6) and/or the said one or more operating units (7) are each driven by an independent motor (18), the said motors (18) being controlled in a synchronized manner.

15. Apparatus (1) according to claim 14, wherein the said motors (18) are brushless motors or stepping motors.

16. Apparatus according to claim 1, comprising in addition a control and monitoring unit for the motor drive (18).

17. Apparatus (1) according to claim 1, wherein the said plate (3) accommodates ventilation and air filtration means (20).

* * * * *